(12) United States Patent
Donelon

(10) Patent No.: US 6,863,930 B2
(45) Date of Patent: Mar. 8, 2005

(54) REFRACTORY METAL MASK AND METHODS FOR COATING AN ARTICLE AND FORMING A SENSOR

(75) Inventor: Matthew J. Donelon, Wichita Falls, TX (US)

(73) Assignee: Delphi Technologies, Inc., Troy, MI (US)

( * ) Notice: Subject to any disclaimer, the term of this patent is extended or adjusted under 35 U.S.C. 154(b) by 163 days.

(21) Appl. No.: 10/236,300

(22) Filed: Sep. 6, 2002

(65) Prior Publication Data

US 2004/0047992 A1 Mar. 11, 2004

(51) Int. Cl.[7] .............................. B05D 1/32; C23C 4/10; C23C 4/06
(52) U.S. Cl. ....................... 427/448; 427/450; 427/451; 427/455; 427/282
(58) Field of Search ....................... 427/282, 446–456, 427/458

(56) References Cited

U.S. PATENT DOCUMENTS

| | | | |
|---|---|---|---|
| 4,037,111 A | 7/1977 | Coquin et al. ............... 250/505 |
| 4,320,323 A | 3/1982 | Magendans et al. ......... 313/330 |
| 4,333,067 A | 6/1982 | Kugimiya et al. ............ 338/34 |
| 4,377,734 A | 3/1983 | Mashiko et al. ........ 219/121 PE |
| 4,717,625 A | 1/1988 | Watakabe et al. ............ 428/432 |
| 4,783,371 A | 11/1988 | Watakabe et al. ............ 428/432 |
| 5,013,682 A | * 5/1991 | Plumton et al. ............. 438/489 |
| 5,176,792 A | 1/1993 | Fullowan et al. ............ 156/652 |
| 5,284,544 A | 2/1994 | Mizutani et al. ............. 156/345 |
| 5,696,619 A | 12/1997 | Knipe et al. ................. 359/224 |
| 5,870,448 A | 2/1999 | Maehara et al. ............... 378/35 |
| 6,051,122 A | 4/2000 | Flanigan ................. 204/298.11 |
| 6,051,346 A | 4/2000 | Kornblit et al. ................ 430/5 |
| 6,059,938 A | 5/2000 | Visser .................... 204/192.12 |
| 6,096,404 A | 8/2000 | Ghantiwala ................. 428/138 |
| 6,117,760 A | 9/2000 | Gardner et al. .............. 438/618 |
| 6,149,785 A | 11/2000 | Makowiecki et al. .. 204/298.28 |
| 6,186,153 B1 | 2/2001 | Kitsunai et al. .............. 134/1.1 |
| 6,200,431 B1 | 3/2001 | Sone ...................... 204/192.12 |
| 6,227,033 B1 | 5/2001 | Kainz |
| 6,382,198 B1 | 5/2002 | Smith et al. |
| 6,386,140 B1 | 5/2002 | Muller et al. ................ 118/723 |
| 6,453,726 B1 | 9/2002 | Gutierrez et al. |
| 6,484,561 B2 | 11/2002 | Jackson et al. |
| 6,514,397 B2 | 2/2003 | LaBarge et al. |
| 6,544,467 B2 | 4/2003 | Symons et al. |
| 6,562,747 B2 | 5/2003 | Symons et al. |
| 6,579,435 B2 | 6/2003 | Wang et al. |
| 6,579,436 B2 | 6/2003 | Wang et al. |
| 6,585,872 B2 | 7/2003 | Donelon et al. |

FOREIGN PATENT DOCUMENTS

EP  0825272 B1  1/2002
EP  0586756 B1  4/2002

* cited by examiner

Primary Examiner—Fred J. Parker
(74) Attorney, Agent, or Firm—Jimmy L. Funke

(57) ABSTRACT

In one embodiment, a method for coating an article, comprises: masking an area of an article with a mask comprising elemental tungsten at least on a surface of the mask opposite the article, heating a coating material, directing the material at the article and the mask, and forming a coating of the material on the article.

In another embodiment, the method for coating an article comprises: masking an area of an article with a mask comprising a material having melting point of greater than or equal to about 2,000° C., a start of oxidation temperature of greater than or equal to 400° C., in air, heating a material, directing the heated material at the masked article, and forming a coating of the material on the article. A difference in a mask coefficient of thermal expansion and a coating material coefficient of thermal expansion is greater than or equal to about 10%.

23 Claims, 1 Drawing Sheet

REFRACTORY METAL MASK AND METHODS FOR COATING AN ARTICLE AND FORMING A SENSOR

BACKGROUND

Thermal spray technologies, e.g., plasma spray, flame spray, and the like, have been employed to apply various coatings, such as ceramic coatings, to an article. For example, European Patent No. 0825272 to Nakagawa et al. describes a high speed thermal spray coating method. In this process, a high speed flame is produced using a combustion gas and then thermal spray coating material powder is sprayed by a flame gun into a receiving surface of a base material using the high speed flame. U.S. Pat. No. 6,386,140 to Müller et al. illustrates an example of a plasma spray apparatus.

The process for using a plasma spray apparatus or flame spray apparatus to apply a coating to an article typically entails disposing the article in a nest. The nest holds and masks the article such that only the desired area of the article will be coated during the spraying process. In a flame spray process, ceramic powders, for example, are then heated to temperatures of up to about 2,000° C. while they are sprayed at the article.

In some applications, e.g., to flame spray coat an oxygen sensor with a ceramic (at ceramic material temperatures of about 2,000° C.), copper-aluminum-bronze nests have been found to be particularly useful. Unfortunately, however, for processes, e.g., plasma spray processes, where the ceramic material can strike the article and nest at temperatures of up to about 6,000° C. and possibly greater, copper-aluminum-bronze nests have the disadvantage that the ceramic material adheres to the nest, and the nest can melt, oxidize, or otherwise degrade and fail. Additionally, adhesion of the coating material to the nest changes the nest size and consequently the area masked by the nest. As a result, the nest requires regular cleaning in order to maintain reproducibility in the coating process and to attain coated articles that meet the desired specifications. For example, bronze nests used under these conditions require cleaning every approximately 30 minutes. Since the ceramic forms a hard coating on the nest, cleaning can be difficult, time consuming, and can damage the nest. For instance, cleaning can comprise striking the nest with an object (e.g., a hammer or similar tool) to crack and enable removal of the coating. Alternatively, the nest can be plunged into liquid nitrogen to crack and remove the coating. Another coating removal technique comprises grit blasting the nest. All of these techniques adversely effect the structural integrity and geometry of the nest. Since the nest acts as a mask (e.g., similar to a stencil), maintenance of the size and geometry of the nest is important in attaining reproducible coating applications.

In order to avoid some of the disadvantages of metal or alloy nests, disposable nests are utilized in some applications, such as in the aerospace industry. For example, various airline components (stators, blades, and the like) are masked with a tape (e.g., a Nextel® tape). Application and removal of the tape is a manual, time consuming process. Additionally, since it is a manual process, the precision of the application of the tape is affected by human error, and the cost of this process is not only a function of the coating materials but also of the labor costs and the fact the masks are disposable.

SUMMARY

The present disclosure relates to masks, methods for coating articles, and processes for making sensors. In one embodiment, a method for coating an article, comprises: masking an area of an article with a mask comprising elemental tungsten at least on a surface of the mask opposite the article, heating a coating material, directing the coating material at the article, and forming a coating of the material on the article.

In another embodiment, the method for coating an article comprises: masking an area of an article with a mask comprising a material having melting point of greater than or equal to about 2,000° C., a start of oxidation temperature of greater than or equal to 400° C., in air, heating a material, directing the heated material at the masked article, and forming a coating of the material on the article. A difference in a mask coefficient of thermal expansion that is greater than or equal to about 10% lower than a coating material coefficient of thermal expansion.

In one embodiment, the method for forming a sensor comprises: disposing electrodes on opposite sides of a first end of an electrolyte to form a sensor element, disposing the sensor element in a mask at least a portion of a second end of the electrolyte is masked and at least a portion of the first end is exposed, heating a coating material, contacting the exposed first end with heated coating material to form a protective coating on at least a portion of the first end, forming a coated element, disposing a heater in thermal communication with the electrodes, disposing the coated element in a housing, and disposing a wiring harness in electrical communication with the electrodes and the heater. The mask comprises a material having melting point of greater than or equal to about 2,000° C., a start of oxidation temperature of greater than or equal to 400° C., in air. Also, there is a difference in a mask coefficient of thermal expansion greater than or equal to about 10% lower than a coating material coefficient of thermal expansion.

The above described and other features are exemplified by the following figures and detailed description.

BRIEF DESCRIPTION OF THE DRAWINGS

Referring now to the figures, which is an exemplary embodiment:

The FIGURE illustrates a mask and thermal spray mechanism wherein a conical sensor is being sprayed.

DESCRIPTION

Figure 1:
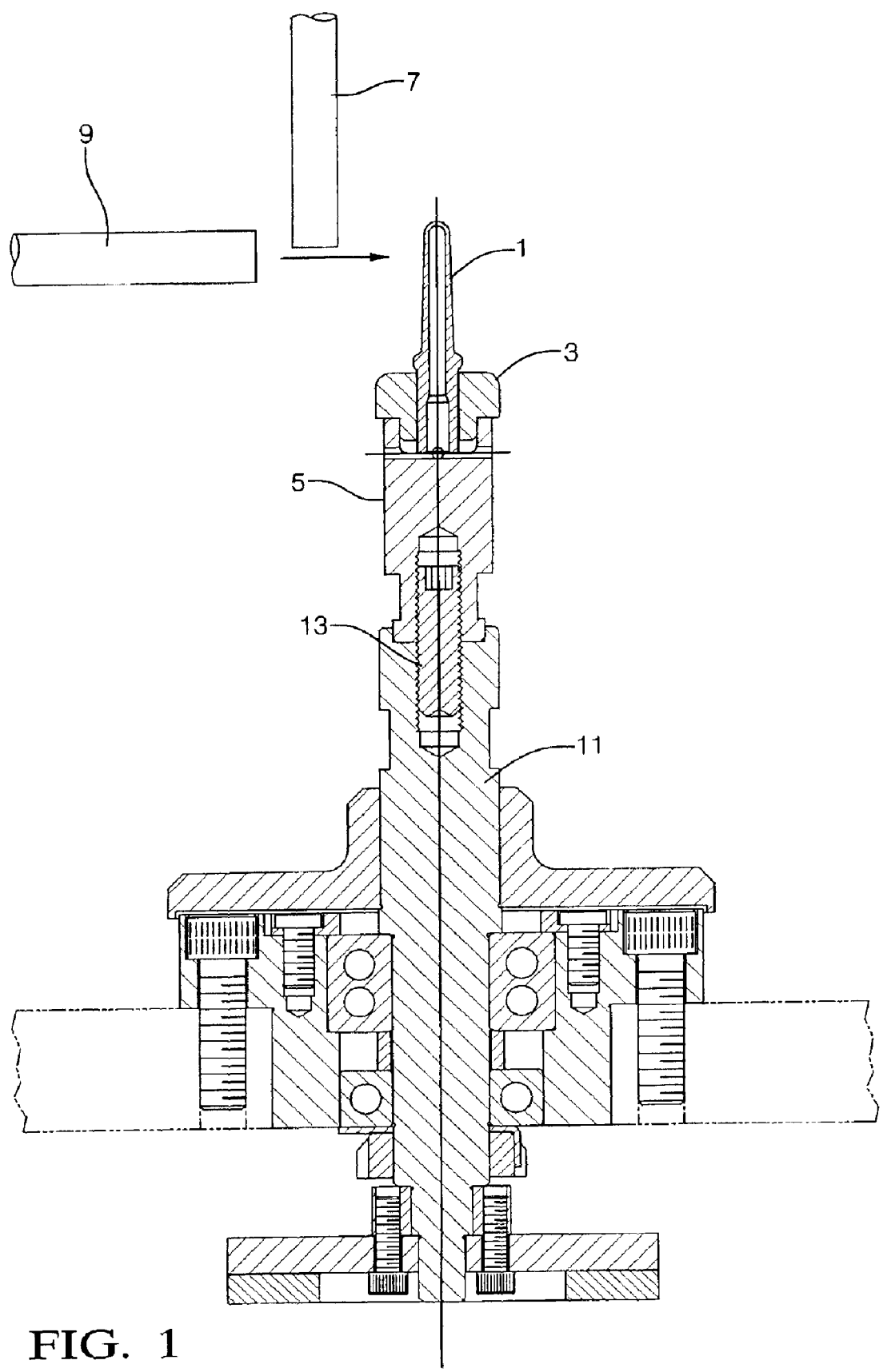

The present application relates to masks (i.e., components that mask and optionally hold articles, e.g., during coating processes) useful in plasma, flame, and other thermal spray processes. The masks are particularly useful in processes in which the material contacting the article and mask has a temperature of greater than or equal to about 3,000° C. It has been discovered that although copper-aluminum-bronze masks are particularly suited for thermal spray processes with materials striking the mask at temperatures of up to about 2,000° C., at higher temperatures they have a limited life (typically production of about 2,000 parts) before requiring rework or scrap due to the adhesion of the sprayed coating to the mask. Although the masks disclosed herein can be used at temperatures of less than 3,000° C. and even less than 2,000° C., the disadvantages of current masks are not realized until higher temperatures where the mask can melt, degrade (e.g., due to impingement by the coating material), oxidize, and/or the coating material can adhere to and deform the overall shape of the mask.

The masks can comprise a material having a melting point of greater than or equal to about 2,000° C., a start of oxidation temperature (i.e., start of oxidation in air is the point when a mirror finish of an article comprising the material is lost) of greater than or equal to about 400° C., a difference in coefficient of thermal expansion between the mask and the coating material, and preferably a mirror surface finish and a Rockwell hardness, C Scale (Rc) of greater than or equal to about 25. With respect to the melting point, a melting point of greater than or equal to about 2,400° C. is preferred, with greater than or equal to about 2,700° C. more preferred. The start of oxidation temperature is preferably greater than or equal to about 450° C., in air, greater than or equal to about 475° C., in air, more preferred, and greater than or equal to about 500° C., in air, even more preferred.

The difference in the coefficient of thermal expansion is preferably sufficient to inhibit adhesion of the coating material to the mask upon cooling. Generally, a difference in a mask coefficient of thermal expansion of greater than or equal to about 10% lower than the coating material coefficient of thermal expansion can be employed, with a greater than or equal to about 25% lower preferred, greater than or equal to about 30% lower more preferred, and greater than or equal to about 40% lower than the coating material coefficient of thermal expansion especially preferred.

The surface finish of the mask and the hardness are preferably chosen to further enhance structural integrity and inhibit coating material adhesion. A mirror finish is preferred, with a satin or similar finish acceptable. Typically, an average surface roughness (Ra) of less than or equal to about 1.00 micrometers is preferred, less than or equal to about 0.80 or less micrometers more preferred, and less than or equal to about 0.40 micrometers especially preferred. Also preferred is a surface comprising no tool marks. The mask can optionally be machined finished and/or polished to attain the desired surface polish.

The hardness of the mask is dependent upon the desired structural integrity and life of the mask. Preferably, the hardness can be greater than or equal to about 25 Rc, with an Rc of greater than or equal to about 27 preferred, and an Rc of greater than or equal to about 30 especially preferred.

Possible mask materials can include refractory metals and alloys comprising at least one of these metals, such as tungsten, molybdenum, rhenium, osmium, iridium, ruthenium, and/or tantalum. Preferably, the mask comprises tungsten and/or a tungsten alloy, with at least a coating of elemental tungsten on the part of the mask that will be contacted with the coating material more preferred. Elemental tungsten has a melting point of about 3,400° C., start of oxidation temperature of about 800° C. in air, and Rc of about 30 to about 35. For example, the mask can comprise a tungsten alloy, such as tungsten-copper, tungsten-molybdenum, tungsten-copper-aluminum, and the like, with an elemental tungsten coating (e.g., spray coated on the mask). Where the elemental tungsten constitutes a coating on a tungsten alloy, the coating preferably has a sufficient thickness to maintain the desired start of oxidation temperature of greater than or equal to about 450° C., Rc of greater than or equal to about 25, and melting point of greater than or equal to about 2,000° C. Typically, the coating can have a thickness of greater than or equal to about 500 micrometers, with greater than or equal to about 750 micrometers preferred. In another embodiment, the mask can consists essentially of elemental tungsten preferably having a purity of greater than or equal to about 98%.

The form of the mask, i.e., the size and geometry, are based upon the size of the article to be held and/or masked. The mask can be a block, clamp, holder or the like, having the size and shape of the area of the article to be masked. Alternatively, the mask can merely be a sheet, similar to a tape that can be disposed over a desired area of an article to be masked. For example, the mask can be an elemental tungsten sheet having the geometry of an airplane engine vane to be masked. Alternatively, the nest can be a clamp capable of securing and masking an oxygen or other sensor to enable application of a protective coating to a desired area of the sensor, e.g., over the sensing tip.

Thermal spray coating an article comprises masking the article with the mask. If the elemental tungsten coated mask is employed, the article is disposed such that the mask, which is disposed between the article and the spray apparatus, is oriented such that the side comprising the elemental tungsten will be contacted by the over-spray from the spray apparatus; e.g., an interior side of the mask is disposed adjacent to the article while an exterior side comprising the elemental tungsten is disposed on a side opposite the interior side. In other words, the elemental tungsten side of the mask is the side opposite the article, facing the spraying apparatus. During operation coating material, e.g., ceramic powder or another material to be coated onto the article, is introduced to the thermal spray apparatus, e.g., into the plasma produced thereby. The plasma heats the material as it is propelled toward the article. Upon contacting the article, the material cools and adheres to the article in the un-masked areas. Relative motion can be created between the coating spray and the article to attain a uniform coating and to coat the desired area of the article. Since the mask resists coating adhesion, the spray can be directed at the interface of the masked and unmasked area of the article. This enables production of a "clean" coating line where the coating thickness is substantially uniform and doesn't trial off at the ends. Once the desired coating thickness has been obtained, the article is cooled (passively or actively), and removed from the spray area. As the mask cools, any coating that may have adhered to the mask debonds, leaving the mask in its original condition. Optionally, if any coating material remains on the mask after cooling (e.g., a little dust), the coating material the mask can be brushed, dusted, or wiped to remove any remaining coating.

This process can be employed to coat the sensing cone area of a conical sensor. Since the sprayed sensor is subsequently disposed into another component, the overall dimensions of the sensor are important. Consequently, the thickness of the coating and the location of the coating on the sensor are important. Essentially, the coating should cover the sensing end to protect it from particles and other matter in the gas to be sensed, and the coating should end at a specified area so that it does not interfere with the sensor's fit into other components. Therefore, the size and shape of the mask that holds and masks the sensor during the plasma spray process are important to attain the desired coating.

The FIG. illustrates an embodiment of a thermal spray apparatus and mask for use in a sensor coating process. The tungsten mask 3, which is holding and masking a conical sensor 1, is connected to a bronze adapter 5 via a connector 13. The connector 13 further connects the bronze adapter 5 to a rotatable shaft 11. During use, the shaft 11 rotates, spinning the sensor 1 as powder from powder injector 7 is introduced into a plasma from plasma nozzle and conduit 9. The powder is heated in the plasma and propelled at the sensor and mask. As the sensor spins and the powder is propelled, relative motion is created between the plasma nozzle 9 and the sensor 1 such that the desired area of the sensor 1 can be coated. Due to the strong resistance to coating adhesion of the mask, the coating can be sprayed directly at the mask-sensor interface such that a uniform coating can be applied on the sensor. In contrast, when employing masks that can not withstand the operating conditions, the coating is often not sprayed directly to the interface of the mask and article to inhibit full contact of the coating with the mask. This results in a non-uniform coating that trails off at the edge where the mask is disposed.

As with conical sensors, appropriately sized and shaped masks could be employed in other various areas, planar sensors, aircraft engine blades, vanes, stators, and the like, jet engine combustion areas (e.g., combustion chambers, ports, bolt holes, and the like) and any other field where thermal spraying is employed.

EXAMPLES

Example 1

Method for Making a Sensor

A sensor is formed by disposing electrodes on opposite sides of a conical electrolyte, e.g., zirconia, to form a sensor element. The sensor element is disposed in a mask such that the upper portion of the element is masked and the sensor end (tip) is exposed. Then, as the sensor element is rotated at about 1,000 revolutions per minute (RPM), a ceramic powder (e.g., spinel (MgO—$Al_2O_3$) or alumina ($Al_2O_3$)) is introduced to a plasma, heated, and propelled at the sensor element. The travel speed of the spray on the part is about 25 millimeters per second (mm/s). The spray nozzle is moved up and down, with one direction considered a pass. The sensor, which is about 48 mm long, is coated in about 9 seconds with 4 passes. After the coated element is cooled, a heater is disposed in thermal communication with the electrodes, a wiring harness is disposed in electrical communication with the heater and electrodes, and the sensor is disposed in a housing.

Example 2

Method for Coating an Aircraft Engine Blade

A mask, in the form of two halves, can be machined from stock, sintered to shape, or formed from a sheet of elemental tungsten. The mask is disposed about the blade and secured with a clamping mechanism or tape. A plasma having a temperature of about 7,000° C. is formed with a plasma spray apparatus. Coating powders are introduced to the plasma stream such that they are heated as they are propelled toward the masked blade. Upon striking the blade, the heated powders cool and adhere. The vast majority of the powder that strikes the mask, i.e., the over-spray, rebounds and is recycled.

Example 3

Test of Possible Mask Materials

In order to determine the usefulness of possible mask materials, 8.5 millimeter diameter rods were formed of various materials. The rods were then subjected to a direct spray process. The spray process comprised introducing spinel to a plasma produced by a Sulzer-Metco F4 plasma spray apparatus operated at 600 amps and 57 volts, with 5 liters per minute (l/min) hydrogen and 30 l/min argon. The nozzle was a 6 mm nozzle and the powder injector was disposed at a 6 mm spacing, with a 5.5 inch distance to the rod. The traverse speed was 25 mm/sec. As the spinel was injected in to the plasma, it was heated and propelled toward the rod. A "spray process" comprised 4 spray passes under the above described conditions. If the spray process did not result in adhesion of the coating to the rod, a subsequent spray process was performed without cooling the rod. This process was employed to determine adhesion of the material to the rod. The rods were evaluated after each spray process. The results of this test are set forth in the Table below.

TABLE

| Rod Material | $MP^1$ (° C.) | Ox $T^2$ (° C.) | Rc | $SP^3$ |
|---|---|---|---|---|
| brass | <1,300 | ~300 | <5 | instantaneous adhesion |
| stainless steel 316 | <1,600 | ~350 | ~25 | instantaneous adhesion |
| aluminum-bronze alloy | <1,300 | ~300 | <5 | 2 |
| D2 tool steel | <1,500 | ~300 | >50 | instantaneous adhesion |
| molybdenum | 2,600 | ~475 | ~25 | 5 |
| tungsten | 3,400 | >500 | ~30 | no adhesion[4] |

[1]MP means melting point of the rod material.
[2]Ox T means starting oxidation temperature of the material as determined from the CRC Handbook of Chemistry and Physics, 54th edition, for the brass, stainless steel, aluminum-bronze alloy, and D2 tool steel; and as determined experimentally for molybdenum and tungsten as set forth below.
[3]SP means the number of spray processes applied to the rod before the coating adhered.
[4]No visible discoloration or adhesion was attained after greater than 20 spray processes. If any dust appeared to be on the rod a gentle wipe would remove it.

It should be noted that, except for tungsten, all of the rods showed visible discoloration (a sign of oxidation) and the coating was difficult to remove.

Ox T test between tungsten and molybdenum was on rods in furnace in air atmosphere for 30 minutes. 400° C. showed no discoloration either material, 450° C. yellowing of molybdenum no color change on tungsten both have mirror finish, 475° C. black oxide on molybdenum no mirror finish left slight blue tint to tungsten with mirror finish retained. 500° C. heavy black oxide on molybdenum, blue tint with mirror finish on tungsten.

Advantages of employing the present mask are numerous. For example, elemental tungsten masks have proven useful to over 6 months of use (e.g., greater than about 50,000 parts), without signs of damage. Due to the lower coefficient of thermal expansion of the mask versus the ceramic material coating the little material that occasionally remains on the mask, upon cooling of the mask, shrinks and debonds therefrom. This process retains the integrity and shape of the nest and enables simple, effective reclamation of the over-spray for reuse because the majority of the powder rebounds off of the nest intact. Finally, the nest can be produced in various forms, blocks, intricate mask geometries, sheets, and the like, to enable their use in various industries as thermal spray masks.

An additional advantage of the mask disclosed herein is that it is conducive to automation. For example, currently aircraft engine blades, vanes, and other components are manually taped to masked desired areas prior to thermal spraying. After the thermal spraying is complete, the tape is manually removed and disposed of. With the use of the mask sheets (e.g., tungsten sheets), however, an automated process can be employed to dispose the sheet between the article and the thermal spray apparatus. Subsequent to coating, the articles are automatically removed from the spray area and additional articles are moved into the spray area. Meanwhile, over-spray that rebounds off of the mask can optionally be collected and recycled. Automation can allow mass production; reduce cycle time, increase accuracy, reduce and possibly eliminate human error, and reduce the costs (enhanced recycling of over-spray and elimination of the disposable components (i.e., the tapes)).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for coating an engine component, comprising:
   masking an area of the engine component with a mask comprising elemental tungsten at least on a surface of the mask opposite the engine component;
   heating a coating material;
   directing the coating material at the engine component and the mask; and
   forming a coating of the material on unmasked portions of the engine component.

2. A method for coating an article, comprising:
   masking an area of the engine component with a mask comprising elemental tungsten at least on a surface of the mask opposite the engine component;
   heating a coating material, wherein the coating material is heated by a thermal spray apparatus selected from the group consisting of plasma spray apparatus and flame spray apparatus;
   directing the coating material at the engine component and the mask; and
   forming a coating of the material on unmasked portions of the engine component.

3. A method for coating an engine component, comprising:
   masking an area of the engine component with a mask comprising a mask material having melting point of greater than or equal to about 2,000° C., and a start of oxidation temperature of greater than or equal to 400° C., in air;
   heating a coating material;
   directing the heated coating material at the masked engine component; and
   forming a coating of the coating material on the engine component;
   wherein there is a difference in a mask coefficient of thermal expansion is greater than or equal to about 10% lower than a coating material coefficient of thermal expansion.

4. A method for forming a sensor, comprising:
   disposing electrodes on opposite sides of a first end of an electrolyte to form a sensor element;
   disposing the sensor element in a mask at least a portion of a second end of the electrolyte is masked and at least a portion of the first end is exposed;
   heating a coating material;
   contacting the exposed first end with heated coating material to form a protective coating on at least a portion of the first end, forming a coated element;
   disposing a heater in thermal communication with the electrodes;
   disposing the coated element in a housing; and
   disposing a wiring harness in electrical communication with the electrodes and the heater;
   wherein the mask comprises a material having melting point of greater than or equal to about 2,000° C., a start of oxidation temperature of greater than or equal to 450° C., in air, and wherein there is a difference in a mask coefficient of thermal expansion and a coating material coefficient of thermal expansion of greater than or equal to about 10%.

5. The method of claim 4, wherein the start of oxidation temperature is greater than or equal to about 475° C., in air.

6. The method of claim 5, wherein the start of oxidation temperature is greater than or equal to about 500° C., in air.

7. The method of claim 4, wherein the mask comprises an elemental tungsten coating.

8. The method of claim 4, wherein the coating material is heated to a temperature of greater than or equal to about 3,000° C.

9. A method for coating an article, comprising:
   masking an area of the engine component with a mask comprising elemental tungsten at least on a surface of the mask opposite the engine component;
   heating a coating material, wherein the coating material is heated to a temperature of greater than or equal to about 3,000° C.;
   directing the coating material at the engine component and the mask; and
   forming a coating of the material on unmasked portions of the engine component.

10. A method for coating an article, comprising:
    masking an area of an article with a mask comprising a mask material having melting point of greater than or equal to about 2,000° C., and a start of oxidation temperature of greater than or equal to 400° C., in air;
    heating a coating material by a thermal spray apparatus selected from the group consisting of plasma spray apparatus and flame spray apparatus;
    directing the heated coating material at the masked article; and
    forming a coating of the coating material on the article;
    wherein there is a difference in a mask coefficient of thermal expansion is greater than or equal to about 10% lower than a coating material coefficient of thermal expansion.

11. The method of claim 10, wherein the mask coefficient of thermal expansion is greater than or equal to about 30% lower than the coating material coefficient of thermal expansion.

12. The method of claim 11, wherein the mask coefficient of thermal expansion is greater than or equal to about 40% lower than the coating material coefficient of thermal expansion.

13. The method of claim 10, wherein the melting point is greater than or equal to about 2,400° C.

14. The method of claim 13, wherein the melting point is greater than or equal to about 2,700° C.

15. The method of claim 10, wherein the start of oxidation temperature is greater than or equal to about 450° C., in air.

16. The method of claim 15, wherein the start of oxidation temperature is greater than or equal to about 475° C., in air.

17. The method of claim 16, wherein the start of oxidation temperature is greater than or equal to about 500° C., in air.

18. The method of claim 10, wherein the mask has a Rc is greater than or equal to about 25.

19. The method of claim 18, wherein the Rc is greater than or equal to about 30.

20. The method of claim 10, wherein the mask material is disposed on at least a portion of a surface of the mask contacted by the coating material.

21. The method of claim 10, wherein the mask material comprises a tungsten alloy.

22. The method of claim 10, wherein the mask has an elemental tungsten coating.

23. The method of claim 21, wherein the tungsten alloy is selected from the group consisting of tungsten-copper, tungsten-molybdenum, and tungsten-copper-aluminum.

* * * * *